United States Patent [19]

Fidrych

[11] 4,030,741
[45] June 21, 1977

[54] CORD GRIPS

[75] Inventor: Alfred Walter Fidrych, Stonington, Conn.

[73] Assignee: Harvey Hubbell, Incorporated, Orange, Conn.

[22] Filed: Jan. 20, 1975

[21] Appl. No.: 542,394

[52] U.S. Cl. .............................. 285/161; 285/322; 285/342; 285/348
[51] Int. Cl.² ......................................... F16L 5/00
[58] Field of Search .......... 285/161, 341, 342, 343, 285/354, 348, 323, 249, 255, 321, 322, 356, 149, 389; 16/2; 174/65 SS, 137; 339/103 B; 29/157; 403/371, 342, 374

[56] References Cited

UNITED STATES PATENTS

| | | | |
|---|---|---|---|
| 939,501 | 11/1909 | Hinds | 285/322 X |
| 2,726,104 | 12/1955 | Boitnott et al. | 285/354 X |
| 2,770,668 | 11/1956 | Appleton | 174/137 |
| 2,798,744 | 7/1957 | Budnick | 285/149 |
| 2,833,569 | 5/1958 | Budnick | 285/389 |
| 3,056,852 | 10/1962 | Sachs | 16/2 X |
| 3,150,886 | 9/1964 | Briegel et al. | 285/161 |
| 3,262,188 | 7/1966 | Briegel et al. | 29/157 |
| 3,379,459 | 4/1968 | Smid | 285/323 X |
| 3,567,843 | 3/1971 | Collins et al. | 285/161 X |
| 3,647,934 | 3/1972 | Hurtt | 285/161 X |
| 3,667,783 | 6/1972 | Sotolongo | 285/161 |
| 3,733,093 | 5/1973 | Seiler | 285/348 |
| 3,809,413 | 5/1974 | Boisserand | 285/356 |
| 3,833,754 | 9/1974 | Philibert | 285/161 X |

FOREIGN PATENTS OR APPLICATIONS

| | | | |
|---|---|---|---|
| 704,730 | 2/1931 | France | 285/323 |
| 1,340,708 | 9/1963 | France | 285/343 |
| 851,184 | 9/1939 | France | 403/371 |

*Primary Examiner*—Dave W. Arola
*Attorney, Agent, or Firm*—Jerry M. Presson

[57] ABSTRACT

Various embodiments of a device for gripping elongated objects, such as electrical cords, are disclosed. The device comprises a one-piece, generally C-shaped ring member formed of at least two arcuate ring sections. The sections are hinged together to open and close in directions substantially normal to the longitudinal axis of the object encompassed by the grip. The ring sections have external camming surfaces which engage interior camming surfaces formed in a threaded nut with relatively low friction so that the ring sections are cammed inwardly to impart inwardly directed compressive forces to the object as the nut is tightened. The ring may be used to transmit axially directed forces produced by tightening the nut to a compressible sealing grommet encompassing the object. In such a case, the end of the section leading in the direction of nut rotation is inclined with respect to the longitudinal axis of the object to facilitate closing the ring about the object.

14 Claims, 8 Drawing Figures

U.S. Patent  June 21, 1977  4,030,741
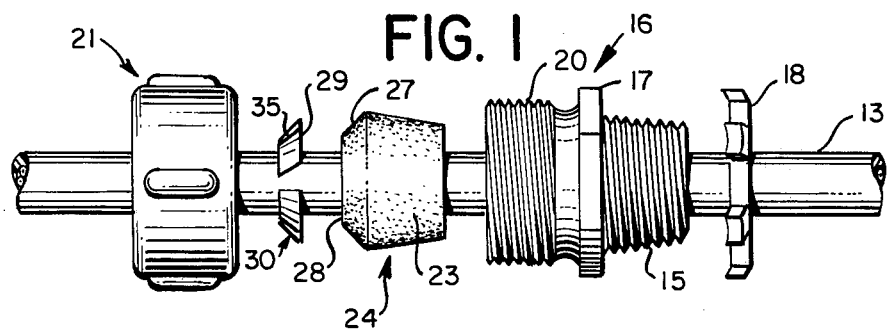
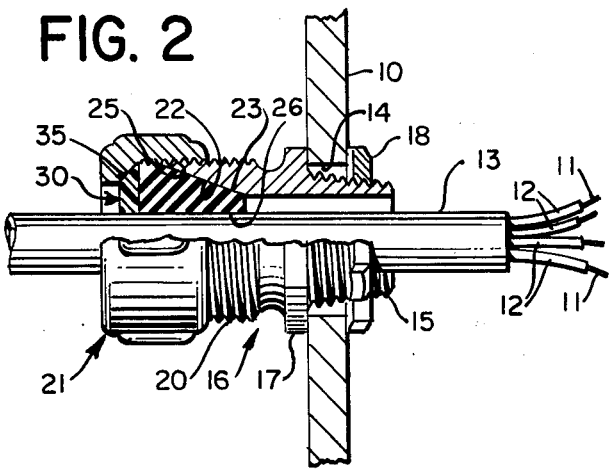 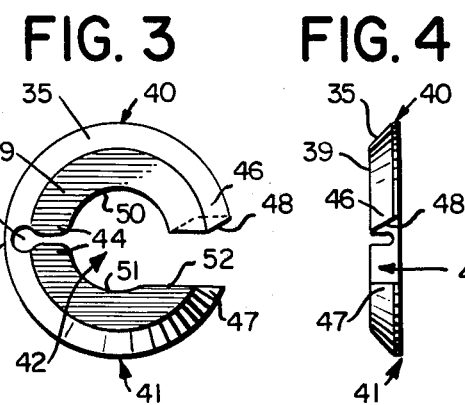 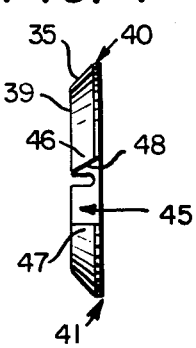
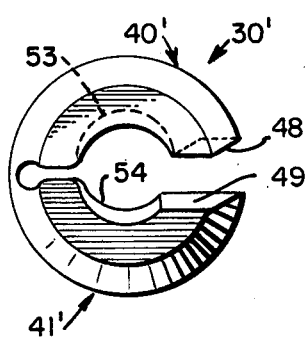 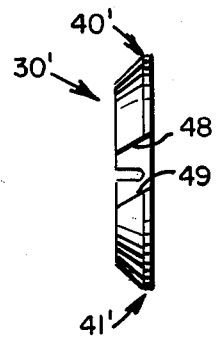 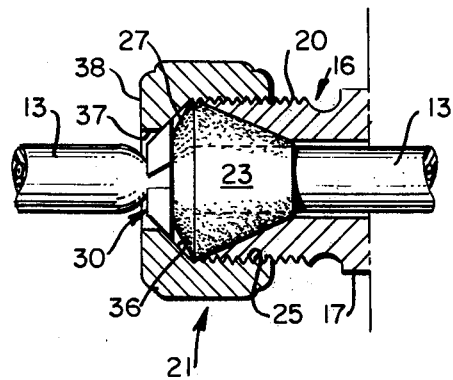
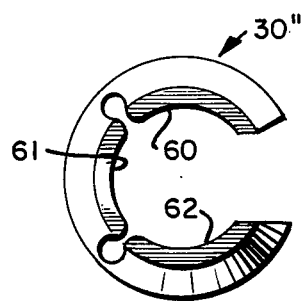

CORD GRIPS

THE INVENTION

This invention relates to an improved apparatus for attaching a cord member to a support and more particularly to an improved cord grip for securing a cord in liquid-tight relationship to a supporting member.

An electrical cord is comprised of one or more flexible insualted conductors enclosed in a flexible insulating sheath. Since the conductors are single metallic wires or groups of twisted metallic strands and the cord sheath is typically comprised of a polymeric compound, the elongation of the conductors is usually less then the elongation of the cord sheath under a given tensile force. If the cord is secured to a support member by a cord grip which does not also effectively grip the electrical conductors in the cord, when a length of cord on one side of the cord grip is pulled taut, there is the possibility that the electrical conductors extending from the other side of the cord grip will not be prevented from moving longitudinally.

Therefore, in order that a cord grip be effective, it should be capable of inhibiting any substantial transmission of tensile forces to the conductors which are inside the sheath and located between the grip and the electrical terminals of apparatus to which the conductor ends are mechanically and electrically connected. Otherwise, relatively high tensile forces applied to the cord on one side of the grip would be transmitted through the grip by the metal conductors to the conductor terminal ends. Such forces will at least strain and in extreme cases, cause separation between one or more conductor terminal ends and the electrical terminals of the apparatus to which such ends are attached.

Certain types of prior art cord grips of which I am familar are designed for use with a given range of cord diameters. Based upon experiments which I have conducted on these grips, the restraining power of the grips becomes less effective at the lower end of the cord diameter range. This is so because these grips rely upon a resilient bushing or grommet to grip the cord as well as seal the juncture between the bushing and the sheathing. The smaller the diameter of cord within a given range, the lower will be the compressive forces which are generated by the bushing on the cord.

It is an object of this invention to provide a new and improved cord grip.

Another object is to provide an improved cord grip capable of gripping a cord sheathing and at least one less extensible conductor such that tensile forces caused by pulling a cord length extending from the grip end are not transmitted through the grip to the conductor extending from the opposite end of the grip.

Still another object of this invention is to provide an improved gripping device for use in a cord grip which applies to a gripped insulated cord, high intensity radially compressive forces that penetrate the cord insulation to impede linear displacement of underlying metallic conductors relative to the cord insulation.

A further object of the invention is to provide an improved cord grip that will, without requiring an increase in the overall size of the grip, enable it to effectively grip cords of a substantially wider range of diameters than is possible with prior art cord grips.

Still another object is to provide a cord grip which does not rely primarily on a sealing bushing or grommet to prevent longitudinal movement of the cord relative to the grip.

Other objects of the invention, as well as the advantages and novel features of construction thereof, will appear from the following description, when read in connection with the accompanying drawing, in which FIG. 1 is an exploded view showing in side elevation a cord grip of the instant invention;

FIG. 2 is a side elevation, partly in section, showing the cord grip of FIG. 1 assembled on a support structure;

FIG. 3 is a front elevation of one embodiment of a unique gripping device constructed in accordance with this invention for use with the instant cord grip.

FIG. 4 is a side elevation of the gripping device shown in FIG. 3;

FIG. 5 is a front elevation of another embodiment of a gripping device constructed in accordance with this invention;

FIG. 6 is a side elevation of the gripping device shown in FIG. 5;

FIG. 7 is a side elevation, partly in section, showing the relation of various parts of the cord grip when the grip is tightly gripping a cord; and FIG. 8 is a front elevation of another embodiment of the gripping device of this invention, formed of three hinged gripping portions.

The cord grip constructed in accordance with this invention does not rely primarily upon the cord sealing bushing or grommet to grip a cord. The grip comprises a tubular body externally threaded on at least one end thereof and a conically tapered seat formed in the one end concentric with the longitudinal axis of the body accommodates the deformable conically tapered sealing bushing. The bushing has a longitudinal bore which is slightly greater in diameter than that of the cord passing longitudinally through the body and seat. One end of the bushing extending outwardly from the seat is abutted by a one-piece, generally C-shaped annular gripping ring comprised of at least two arcuate ring portions which grip therebetween the sheathing of the cord when the ring is compressed. Reliance is primarily made upon the gripping ring to restrain the cord and the conductors inside the cord.

The ring portions are hinged together for pivotal movement and are provided with free ends which permit inward and outward movements of the ring portions in a plane substantially normal to the longitudinal axis of the cord and busing. A section of the periphery of the grip is tapered to cam the ring portions closed in response to longitudinal inwardly directed forces. These forces are provided by a gland nut having an internal camming surface complimentary to the cam surface of the ring. The nut threadedly engages the threaded end of the grip body and applies inwardly directed forces against the cam surface of the ring as the nut is tightened causing the ring to advance inwardly against the outwardly extending end of the bushing while the ring slides on and contracts about the cord sheath.

As the ring contracts, it applies essentially inwardly directed compressive forces essentially normal to the longitudinal axis of the cord sheath and these forces are of high enough intensity to transmit through the sheath to the metallic wires or strands which constitute the electrical conductors of the cord. The transmitted forces are also essentially normal to the longitudinal axis of the conductors and serve at least to impede longitudinal displacement of the conductor wires relative to the gripping ring. Moreover, as the bushing is driven inwardly by the ring, the bushing compresses against the cord sheath and the tapered seat of the body to provide a liquid-tight seal between the cord sheath and the body.

By providing a contractible gripping ring which can be cammed inwardly a substantial amount, the instant cord grip may be used to grip a range of different diametered cord sizes. This allows for reductions in the manufacturing cost and inventory of the cord grip supplier and installer.

The cord grip of this invention is shown in FIG. 2 of the drawings for securing an electrical cord in liquid-tight relation to a fixed support 10 which may be the wall of an electrical outlet box containing electrical terminals to which terminals of the cord conductors are mechanically and electrically connected. Typically, each electrical cord conductor is composed of an individual wire or a bundle of wire strands 11. Each such connector is enclosed by a sleeve of insulating material 12 to insulate one from the other. A plurality of insulated conductors are encased in a cord sheath 13 typically composed of rubber or a suitable polymeric compound.

The support 10 is provided with an opening 14 for mounting the cord grip and such opening may be plain, as shown, or provided with a female thread into which is threaded a male thread 15 provided on one end of body 16 of the grip. The body 16 of the grip may be made of a suitable metallic or plastic material and may have any one of several shapes, for example, a ninety degree elbow configuration. In the illustrated embodiment, the body 16 has a short, generally cylindrical shape. Located centrally of the body 16 is a projecting hexagonal section 17 of sufficient width to permit the ready application thereto of a wrench for screwing the thread 15 into a female thread that may be provided in the opening 14 and/or for securing on such thread 15 a threaded fastener nut 18. As is shown by FIG. 2, when the body 16 is secured to the support 10, the body is gripped between the hexagonal section 17 and the fastener nut 18. The support engageable face of the hexagonal section 17 may be made large enough to allow a gasket or seal to be placed over the thread 15 to ensure a liquid-tight seal between the grip and support when the grip is secured to the support.

The other end of the body 16 is provided with a male thread 20 for threadedly receiving a compression or gland nut 21. The longitudinal bore through the body 16 is substantially uniform from the outer end of the thread 15 thereon to a point intermediate the ends of the thread 20 thereof and from thence is outwardly tapered to provide at the compression nut end of such body, a conical seat 22 for a body portion 23 of a deformable bushing 24 composed of a resilient elastomer such as Neoprene. The body portion 23 has a conical outer surface tapered substantially, but not necessarily entirely, complementary to the taper of the bore seat 22 and when placed in the latter without compression, rests on such test and projects outwardly therefrom a substantial portion, typically one-half of its length. A bore 20 passes concentrically through the body of the bushing and has a diameter which is slightly greater than the outer diameter of the largest cord that the cord grip is designed to accommodate. When the bushing is axially compressed, the bushing wall defining the bore 26 presses tightly upon the cord sheath 13 and thereby seals that interface against the passage of liquid. Concurrently, the surface of the body potion 23 compresses tightly in its seat 22 and seals that interface also against the passage of liquid.

The outer end of the bushing body 23 also may be tapered as indicated by numeral 27 in terminating at an outer annular, plane face 28, or the surface 27 may be the continued extension of the surface 23. In any case, the outer diameter of face 28 is preferably less than the minor diameter of the female nut thread 25 so as to allow the thread 25 to press over the bushing. Bearing against a substantial, and preferably the entire surface area of the bushing outer face 28, is the inner annular plane face 29 of a gripping ring 30. The inner face 29 also has an outer diameter less than the minor diameter of the female nut thread 25 to permit the nut to be placed over the gripping ring.

The ring 30 is a one-piece structure made of a low-friction material, for example, a polymeric such as Nylon or a soft metal such as brass, so that its planar face 29 may slide with relatively low friction over the bushing face 28. As the nut 21 is tightened on the thread 20 of the body 16, the ring is cammed radially inwardly to produce substantial, radially inwardly directed forces throughout a relatively narrow cross-sectional area of the electrical sheath 13, the insulating sleeves 12 and most importantly, to the electrical conductors 11. To produce this camming action, the outer surface 35 of the ring is tapered inwardly from the inner face 29 thereof and the taper of such surface is substantially complimentary to the taper of an inner camming surface 36, in FIG. 7, formed inside the compression nut 21 between the outer end of the thread 25 thereof and the inner edge of a bore 37. The bore 37 is concentric with respect to the axis of rotation of the nut and extends through the outer end 38 of the nut. The surface 35 terminates at its outer end in a generally planar surface 39 of overall cylinder shape and has an outside diameter slightly less than the diameter of the bore 37. As the surface 36 advances inwardly relative to the surface 35 of the ring on tightening rotation of the nut 21, the outer end portions of the ring 30 are free to enter the bore 37 unimpeded by the nut end 38.

As shown by FIGS. 3, 4 and 8 of the drawings, the ring 30 is formed of a plurality of hinged ring portions which can be radially compressed by clockwise rotation, FIG. 3, of the nut 21 on the thread 20 of the connector body 16. Considering the embodiments of FIGS. 3 and 4, there are provided two ring portions 40 and 41 of substantially semi-circular overall configuration and of substantially the same size. The portions define between them a central opening 42 of a diameter approximating the average exterior diameter of the electrical cord in the range of sizes for which the gripping ring 30 is designed. Thus, the cord grip may be used to grip electrical cords having different outside diameters which fall within a given size range. Generally, and for reasons disclosed hereinafter, the smallest cord size for any given range of cord grip is that size wherein the electrical conductors within the cord are not gripped to the desired extent when the nut 21 is tightened as far as possible on the thread section 20.

Communicating with the central opening 42 is the open end of a substantially keyhole shaped slot 43 which extends radially from such opening toward the outer perimeter 40 of the ring and to a point just short of such perimeter so as to leave a relatively narrow, flexible hinge section of material between the bottom of the keyhole slot 43 and the outer edge 40 of the ring. This hinge section, designated as point P in FIG. 3, joins the two ring portions 40 and 41 together for pivotal movement in the vertical plane of the ring and substantially perpendicular to the longitudinal axis of the grip. The shoulders 44 formed at the inner end of the slot 43 coact to function as stops to limit inward movement of the ring portions 40 and 41. The degree of inward pivoted movement or contraction of the ring portions 40 and 41 permitted by shoulders 44 and by the free ends of such ring portions, as will hereinafter become more apparent, is sufficient to enable the gripping ring to exert a restraining pressure which is transmitted radially inwardly through the cord sheath and insulation and finally to the wires or strands forming the electrical conductors in the range of cord sizes for which the ring was designed. Such contraction is limited by portions of each ring abutting one another to prevent the rim 40 of the ring from contracting to a diameter smaller than the diameter of the bore 37 and thereby preventing the ring from being pulled entirely through the opening 37 in the nut 21. The configuration a the slot 43 permits of fairly extensive hinging movement of the two ring portions toward and away from each other enabling the instant cord grip to be used on a larger range of cord sizes than would be possible were the gripping device is completely closed structure. In addition, the two ring portions can be bent back through an arc of at least 180° which allows the ring to be manufactured in a fully open state by injection molding techniques and also provides access to the interior surfaces of the ring portions for any modifications which may be considered desirable.

The ring 30, in diametric opposed relation to the keyhole slot 43, is slotted to provide a gap 45 of a size sufficient to permit pivotal movements of the ring portions 40 and 41 and such that when the latter are constructed to the extent that the shoulders 44, 44 engage the free ends 46 and 47, respectively, of such portions will also engage and cooperate with such stops to limit the inward movement of such ring portions. It is to be observed that as the compression nut 21 is tightened on the body thread 20, the turning movement thereof will cause the ring portion 40 to pivot about point P toward the ring portion 41. During such inward movement of ring portion 40, the leading edge 48 of the free end 46 thereof rotates over a part of the periphery of the electrical conductor to reduce the length of the gap 45.

To facilitate such movement and to prevent such free end 46 from digging into the bushing body 23, the leading edge 48 is inclined outwardly toward the inner face 29 of the gripping ring. The opposite edge of the free end 47 of the ring portion 41 may be parallel to the central axis of the ring as shown in FIGS. 3 and 4, or may also be inclined to the same direction as the leading edge 48, as illustrated by the edge 49 of the portion 41' of the ring 30' shown in FIGS. 5 and 6. Thus, when the ring 30' is completely contracted, shoulders 44 and the opposing surface areas of the edges 48 and 49 will respectively abut and stop further contraction of the ring 30.

The configuration of the conductor gripping surface of the gripping ring may be varied to suit the conditions of its use. Thus, the gripping surfaces 50, 51 of the ring may be made to have the same, approximately semi-circular configuration, or as shown in FIG. 3 of the drawings, the gap 45 may be formed relative to the slot 43 so that the straight offset edge of the free end 47 of the ring portion 41 extends inwardly to provide on such ring portion a planar gipping surface portion 52 opposite the semi-circular gripping surface 50 of the ring portion 40. Instead of being made plain in the manner of the gripping surfaces of ring 30, the gripping surfaces on the ring portions may be formed in the shape of a female screw thread as indicated by the dotted line 53 on the ring portion 40' in FIG. 5, or may have one or more protuberances such as designated by numeral 54 on the ring portion 41' in FIG. 5. Because the two ring portions can be bent back about the hinge section through at least 180°, the interior ring surfaces are readily accessible to effect such modifications.

As illustrated by FIG. 8, the gripping ring 30' may be formed of more than two hinged ring portions. The three illustrated portions 60, 61 and 62 are hinged together by two radially disposed keyhole slots, each similar to the slot 43.

In addition, the bore seat 22 and the bushing 24 may be of cylindrical, rather than of conical shape.

As will be understood from the foregoing, as the compression nut 21 is tightened upon the body 16 of the connector, there will be exerted through the gripping ring 30 onto the outer face 28 of the bushing 23 an axial force which will provide a liquid-tight seal at the interface between the bore 26 and the sheath 13 and at the interface between the tapered body portion 23 and the seat 22. Moreover, as the nut 21 is tightened, the seat 36 coacts with the camming surface 35 on the ring 30 causing the ring to contract and drive the inner gripping surfaces thereof into tight compressive engagement with the electrical cord extending through the connector.

Due to the low frictional characteristics of the material of which the gripping ring is composed, the ring is enable to contract while pressed against the bushing surface 28 and to slide on the tapered nut seat 36 without any appreciable binding as the nut is tightened.

Under the compressive forces exerted on the ring the inner gripping surfaces thereof will press into the relatively soft material of which the sheath 13 is composed. The radial compressive forces exerted through the gripping surfaces will be transmitted through the sheath 13, through the insulation 12 to the conductors 11. Since the gripping ring is discshaped and the gripping surfaces thereof are relatively narrow cross-sectional areas, the relatively high compressive forces exerted by such gripping surfaces will be effectively applied to a relatively narrow cross-section of the sheathing, insulation and electrical conductors in directions substantially normal to the longitudinal axis of these components. These forces effectively inhibit relative longitudinal movements of any of the cord components on one side of the cord grip when tension is applied to a cord section on the other side of the grip thereby ensuring that the grip provides tension and strain relief to any terminal connection to the cord conductors on the one side of the grip.

It will be understood that the instant disclosure has been made by way of example and that numerous changes in the construction and the arrangement of parts may be resorted to without departing from the spirit and scope of the invention.

What is claimed is:

1. Apparatus fo restraining a cord member comprising, a substantially cylindrical body having a threaded section and an inner wall which defines a bore section having a longitudinal axis substantially concentric with the longitudinal axis of said cylindrical body, said cord being mountable in said bore section, a sealing element in said bore section in contact with said inner wall and the cord to provide a seal between the body and the cord, means for restraining the cord against longitudinal displacement in the bore comprising an open-sided ring formed of at least two segments which define therebetween an opening for receiving the cord, hinge means joining said segments together at one end thereof for relative pivotal movement in a plane substantially normal to the longitudinal axis of the bore whereby said ring can open and close on said cord in a plane substantially normal to the longitudinal axis of the bore, one edge of said hinge means being defined by a slot having an open end in communication with said central opening and a closed end extending outwardly from said central opening to a point inside the adjacent perimeter of said ring to leave a narrow, relatively flexible hinge member, opposed portions of the edge of said hinge means adjacent the open end of the slot being sufficiently close to provide two stop abutments which abut when the open ring sides abut to limit the contraction of said ring, camming surfaces formed on the periphery of said two segments, and rotatable means having a threaded section engaging the threaded section of said body and a camming surface for engaging said camming surfaces of said two segments, whereby upon rotation of said rotatable means in one direction, said ring is pressed between said camming surfaces and said sealing element and slides with relatively low friction therebetween such that said segments close to grip the cord.

2. Apparatus as defined by claim 1 wherein said rotatable means has an axis of symmetry concentric with the longitudinal axis of said body and a bore formed in said rotatable means concentric with said axis of symmetry, the diameter of said bore being such as to allow partial entrance of said ring therein.

3. Apparatus as defined by claim 1 wherein said ring is composed of a material having a relatively low coefficient of friction.

4. A cord grip comprising, tubular means for coupling to a support and through which the cord extends and having a portion provided with a first screw thread, adjustable means provided with a second screw thread interengageable with said first screw thread and having an annular tapered seat through which the cord extends disposed in opposed spaced relation to an end surface of said tubular means, a gripping ring having a peripheral surface tapered substantially complementary to that of the tapered seat on the adjustable means and seatable on said tapered seat, said ring having a transverse end surface disposed in opposed relation to said end surface of the tubular means and being composed of a material which slides with relatively low friction over said end surface, at least two cord gripping portions formed on said ring to provide a central opening, hinge means hingedly connecting one end of adjacent ring portions together, opposite ends of said gripping ring being free and normally spaced in opposed relation, one edge of the hinge means being defined by a slot of substantially keyhole shape which opens into said central opening and extends radially from said central opening to an enlarged curved end inside the perimeter of said ring to leave a narrow, relatively flexible hinge member integrally joining said ring portions, the one edge of said hinge means providing two opposed stop abutments at the open end of the slot which are coactable with the free ends of said ring to limit the contraction of said ring; whereby upon rotation of said adjustable means in one direction, said ring portions are pressed between said tapered seat and said end surface of said tubular means such that said ring portions contract to clamp the cord therebetween.

5. A cord grip comprising, tubular means for coupling to a support and through which the cord extends and having a portion provided with a first screw thread, adjustable means provided with a second screw thread interengageable with said first screw thread and having an annular tapered seat through which the cord extends disposed in opposed spaced relation to an end surface on said tubular means, a gripping ring having a peripheral surface tapered substantially complementary to that of the tapered seat on the adjustable means and seatable on said tapered seat, said ring having a transverse end surface disposed in opposed relation to said end surface of the tubular means and being composed of a material which slides with relatively low friction over said end surface, at least two cord gripping portions firmed on said ring to provide a central opening, means hingedly connecting one end of adjacent ring portions together, opposite ends of said gripping ring being free and normally spaced in opposed relation, one free end of said ring being inclined outwardly to prevent the binding thereof when said gripping ring is contracted, the other free end having a transverse surface parallel to the longitudinal axis of said ring, said transverse surface extending inwardly to a point of lesser radius than the inner radius of said one free end so that said transverse surface provides on one ring portion a planar cord gripping area; whereby upon rotation of said adjustable means in one direction, said ring portions are pressed between said tapered seat and said end surface of said tubular means such that said ring portions contract to clamp the cord therebetween.

6. The cord grip as defined by claim 5 wherein said hinged connection is formed by a closed slot having an open end in communication with the central opening in said ring, said slot extending radially from said central opening to a point inside the perimeter of said ring to leave a narrow relatively flexible hinge member integrally joining the ring portions.

7. The cord grip as defined by claim 6 wherein said closed slot is keyhole-shaped to provide two oppsoed stop abutments at the open end thereof, said stops being coactable with said free ends to limit the contraction of said gripping ring.

8. A device for gripping an elongated member comprising, a housing having a threaded section and an inner wall which defines a bore section having a longitudinal axis for receiving a portion of the member, means for gripping the member against longitudinal displacement in the bore comprising a ring formed of at least two segments having arcuate perimeters and opposed free ends, the segments define therebetween an opening for receiving the member, hinge means joining said segments together at ends opposite said free ends for opening and closing movements in directions substantially normal to the longitudinal axis of the bore, said hinge means having an edge surface at least partially defined by a transverse slot of keyhole shape, the relatively narrow end of the slot opening to the central opening in said ring and the relatively wider end of the slot being located inside the perimeter of said ring to provide a narrow, flexible hinge member integrally joining said segments, opposing surfaces of said hinge means adjacent the narrow end of the slot coacting to close upon closure of said ring.

9. The device as defined by claim 8 wherein said gripping means is composed of a material having a relatively low coefficient of friction.

10. The device as define by claim 8 wherein one free end of said ring is inclined outwardly to prevent the binding thereof when said gripping ring is contracted.

11. The device as defined by claim 10 wherein the other free end has a transverse surface parallel to the longitudinal axis of said ring.

12. The device as defined by claim 11 wherein said transverse surface extends inwardly to a point of lesser radius than the inner radius of said one free end so that said transverse surface provides on one ring portion a planar cord gripping area.

13. A cord grip comprising, tubular means for coupling to a support and through which the cord extends and having a portion provided with a first screw thread, adjustable means provided with a second screw thread interengageable with said first screw thread, said adjustable means including an annular tapered seat through which the cord extends disposed in opposed spaced relation to an end surface on said tubular means, a gripping ring having a generally frusto-conical surface tapered substantially complementary to the tapered seat on the adjustable means and seatable on said tapered seat, said ring having an end surface disposed in opposed relation to said end surface of the tubular means, said ring composed of a material which slides with relatively low friction over said end surface and said tapered seat, at least two cord gripping ring sections formed on said ring to provide a central opening for receiving the cord, hinge means for hingedly connecting one end of adjacent ring sections together, opposite ends of said gripping ring sections being free and normally spaced in opposed relation, said hinge means having an edge which at least partially defines a transverse slot of substantially keyhole shape, opposing surfaces of said edge communicating with the central opening in said ring defining a relatively narrower portion of the slot, and an arcuate portion of the edge forming a part of a relatively wider end of the slot opposite said narrower portion and being located inwardly of an adjacent circular part of the peripheral surface of said ring to provide therebetween a relatively narrow, flexible hinge member integrally joining said sections for pivotal movement about a pivot point defined by said hinge member, portions of said ring sections adjoining said hinge member pivoting inwardly about said pivot point while said hinge means maintains said pivot point at a substantially fixed location outwardly of the slot, said ring sections being pressed between said tapered seat and said end surface of said tubular means such that said ring sections contract to clamp the cord therebetween upon rotation of said adjustable means in one direction, the relatively closer opposing surfaces of the relatively narrower portion of the slot substantially avoiding entry of and pinching of the cord between these surfaces during contraction of the ring sections about a cord in the central opening.

14. A cord grip comprising, tubular means for attachment to a support and through which the cord extends and having a portion provided with a first screw thread, adjustable means provided with a second screw thread interengageable with said first screw thread and with an annular tapered seat through which the cord extends and disposed in opposed spaced relation to an end surface on said tubular means, a gripping device having a frusto-conical surface tapered substantially complementary to that of the tapered seat on the adjustable means and seatable on said tapered seat, said device having an end surface disposed in opposed relation to said end surface of the tubular means, said device composed of a material which slides with relatively low friction over said end surface and said tapered seat, at least two cord gripping sections formed on said device to provide a central opening for receiving the cord, hinge means for hingedly connecting one end of adjacent device sections together, opposite ends of said gripping device being free and normally spaced in opposed relation, said hinge means having an edge which is at least partially defined by a transverse slot of substantially keyhole shape, opposing surfaces of said edge opening to the central opening in said device defining a relatively narrower portion of the slot, a circular portion of the edge forming a relatively wider end of the slot opposite said narrower portion and being located inwardly of an adjacent circular part of the peripheral surface of said device to provide therebetween a relatively narrow, flexible hinge member integrally joining said sections for pivotal movement about a pivot point defined by said hinge member, portions of said ring sections adjoining said hinge member pivoting inwardly about said pivot point while said hinge means maintains said pivot point at a substantially fixed location outwardly of the slot, whereby upon rotation of said adjustable means in one direction, said device sections are pressed between said tapered seat and said end surface of said tubular means such that said device sections contract to clamp the cord therebetween, the relatively closer opposing surfaces of the relatively narrower portion of the slot substantially avoiding entry of and pinching of the cord between these surfaces during contraction of the ring sections about a cord in the central opening.

* * * * *